US008961831B2

(12) United States Patent
Du et al.

(10) Patent No.: US 8,961,831 B2
(45) Date of Patent: *Feb. 24, 2015

(54) SILANE-CONTAINING PIGMENT PARTICLES FOR ELECTROPHORETIC DISPLAY

(75) Inventors: Hui Du, Milpitas, CA (US); Haiyan Gu, Fremont, CA (US); HongMei Zang, Sunnyvale, CA (US)

(73) Assignee: E Ink California, LLC, Fremont, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 13/149,599

(22) Filed: May 31, 2011

(65) Prior Publication Data

US 2014/0339480 A1 Nov. 20, 2014

(51) Int. Cl.
*H01B 1/00* (2006.01)
*H01B 1/12* (2006.01)
*H01B 1/02* (2006.01)

(52) U.S. Cl.
USPC ............ 252/500; 252/519.3; 252/520.22

(58) Field of Classification Search
USPC .......... 252/500, 519.3, 520.22; 526/117, 213; 525/269, 267, 340, 353
See application file for complete search history.

(56) References Cited

U.S. PATENT DOCUMENTS

| 4,680,103 | A | 7/1987 | Solomon et al. | |
|---|---|---|---|---|
| 6,599,631 | B2 * | 7/2003 | Kambe et al. | 428/447 |
| 6,822,782 | B2 | 11/2004 | Honeyman et al. | |
| 6,930,818 | B1 | 8/2005 | Liang et al. | |
| 2005/0208635 | A1 | 9/2005 | Nomoto et al. | |
| 2006/0024437 | A1 | 2/2006 | Pullen et al. | |
| 2007/0128352 | A1 | 6/2007 | Honeyman et al. | |
| 2007/0201124 | A1 | 8/2007 | Whitesides et al. | |
| 2010/0324191 | A1 | 12/2010 | Chiruvolu et al. | |
| 2012/0049125 | A1 * | 3/2012 | Du et al. | 252/500 |
| 2014/0011913 | A1 * | 1/2014 | Du et al. | 523/205 |

FOREIGN PATENT DOCUMENTS

| CN | 101387808 A | 3/2009 |
|---|---|---|
| CN | 102399376 A | 4/2012 |
| EP | 1621925 A1 | 1/2006 |
| WO | WO 01/67170 | 9/2001 |
| WO | WO 02/093246 A1 | 11/2002 |
| WO | WO 2005/036129 | 4/2005 |
| WO | WO 2008/052720 A2 | 5/2008 |
| WO | WO2010148061 A2 | 12/2010 |
| WO | WO2010149505 A2 | 12/2010 |

OTHER PUBLICATIONS

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Zang, H.M. (Sep. 2006) *Monochrome and Area Color Microcup® EPDs by Roll-to-Roll Manufacturing Process*. Presentation conducted at the Fourth Organic Electronics Conference and Exhibition (OEC-06), Sep. 25-27, 2006, Frankfurt, Germany.

Wang, X., Zang, H.M. and Li, P. (Jun. 2006) Roll-to-Roll Manufacturing Process for Full Color Electrophoretic film. *SID Digest*, 00pp. 1587-1589.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Liang, R.C., (Feb. 2005) *Flexible and Roll-able Displays/Electronic Paper—A Brief Technology Overview*. Flexible Display Forum, 2005, Taiwan.

Zang, H.M. & Hou, Jack, (Feb. 2005) *Flexible Microcup® EDP by RTR Process*. Presentation conducted at $2^{nd}$ Annual Paper-Like Displays Conference, Feb. 9-11, 2005, St. Pete Beach, Florida.

Ho, Candice. (Feb. 1, 2005) *Microcupt® Electronic Paper Device and Application*. Presentation conducted at USDC 4th Annual Flexible Display Conference 2005.

Bardsley, J.N. & Pinnel, M.R. (Nov. 2004) Microcup™ Electrophoretic Displays. *USDC Flexible Display Report*, 3.1.2. pp. 3-12-3-16.

Liang, R.C. (Oct. 2004) *Flexible and Roll-able Displays/Electronic Paper—A Technology Overview*. Paper presented at the METS 2004 Conference in Taipie, Taiwan.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

(Continued)

*Primary Examiner* — Monique Peets
(74) *Attorney, Agent, or Firm* — Perkins Coie LLP

(57) ABSTRACT

The present invention is directed to an electrophoretic display fluid, in particular, pigment particles dispersed in a solvent or solvent mixture, and methods for their preparation. The pigment particles generated, according to the present invention, are stable in solvent under an electric field and can improve the performance of an electrophoretic display.

10 Claims, 2 Drawing Sheets

(56) References Cited

OTHER PUBLICATIONS

Figure 1:
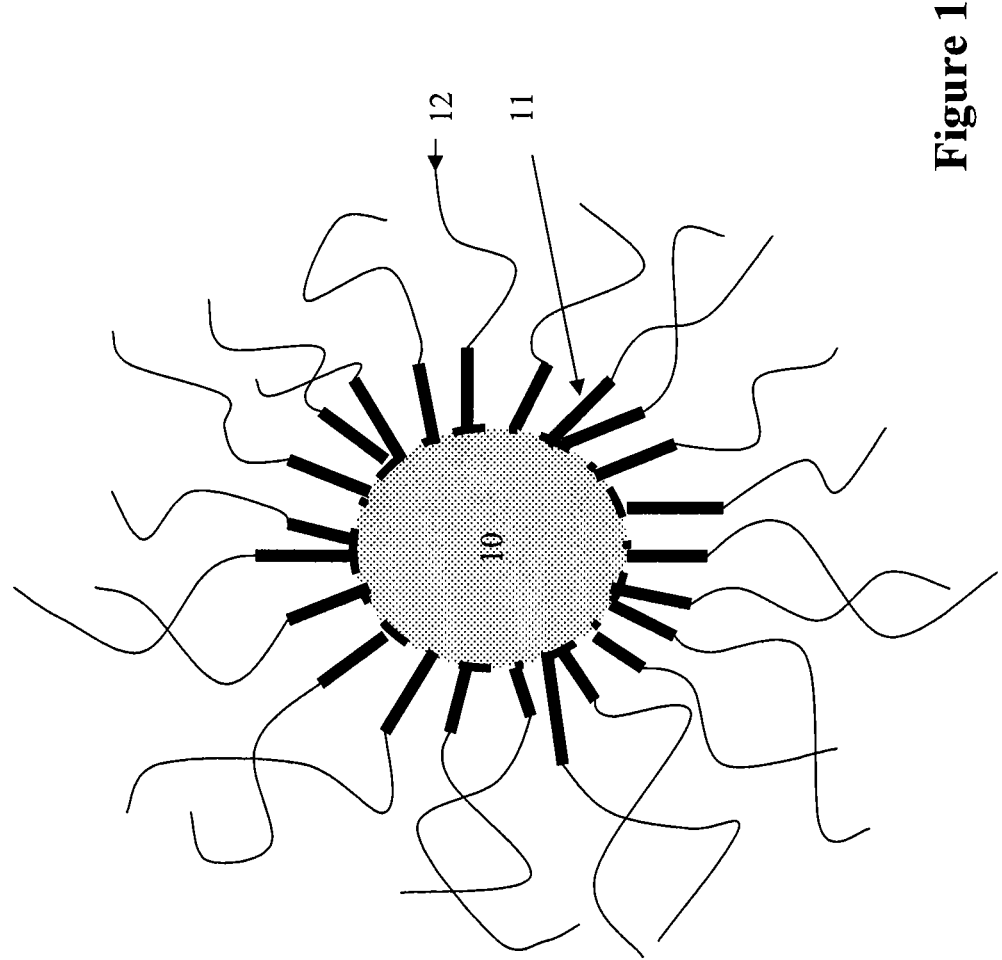

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging*, SPIE vol. 5289, 102-108.

Ho, C., & Liang, R.C. (Dec. 2003). *Microcup® Electronic Paper by Roll-to-Roll Manufacturing Processes*. Presentation conducted at FEG, Nei-Li, Taiwan.

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Allen, K. (Oct. 2003). Electrophoretics Fulfilled. *Emerging Displays Review: Emerging Display Technologies, Monthly Report*—Oct. 2003, 9-14.

Zang, H.M., & Liang, R.C. (2003) Microcup Electronic Paper by Roll-to-Roll Manufacturing Processes. *The Spectrum*, 16(2), 16-21.

Chen, S.M. (Jul. 2003) The Applications for the Revolutionary Electronic Paper Technology. *OPTO News & Letters*, 102, 37-41. (in Chinese, English abstract attached).

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Chen, S.M. (May 2003) The New Application and the Dynamics of Companies. *TRI*. 1-10. (In Chinese, English abstract attached).

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdevices. (Dec. 2002) Newly-Developed Color Electronic Paper Promises—Unbeatable Production Efficiency. *Nikkei Microdevices*, p. 3. (in Japanese, with English translation).

Taiwan Patent Application No. 101116287 Examinassion Report and Search Report, mailed on May 26, 2014.

* cited by examiner

SILANE-CONTAINING PIGMENT PARTICLES FOR ELECTROPHORETIC DISPLAY

FIELD OF THE INVENTION

The present invention is directed to pigment particles, an electrophoretic display fluid and an electrophoretic display utilizing the electrophoretic fluid, and methods for their preparation.

BACKGROUND OF THE INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate back to the opposite plate, thereby reversing the color.

Alternatively, an electrophoretic fluid may have two types of pigment particles of contrasting colors and carrying opposite charges and the two types of pigment particles are dispersed in a clear solvent or solvent mixture. In this case, when a voltage difference is imposed between the two electrode plates, the two types of pigment particles would move to opposite ends (top or bottom) in a display cell. Thus one of the colors of the two types of pigment particles would be seen at the viewing side of the display cell.

For all types of the electrophoretic displays, the fluid contained within the individual display cells of the display is undoubtedly one of the most crucial parts of the device. The composition of the fluid determines, to a large extent, the lifetime, contrast ratio, switching rate and bistability of the device.

In an ideal dispersion, the charged pigment particles remain separate and do not agglomerate or stick to each other or to the electrodes, under all operating conditions. In addition, all components in the fluid must be chemically stable and compatible with the other materials present in an electrophoretic display.

BRIEF DISCUSSION OF THE DRAWINGS

FIG. 1 illustrates a pigment particle of the present invention.

Figure 2:
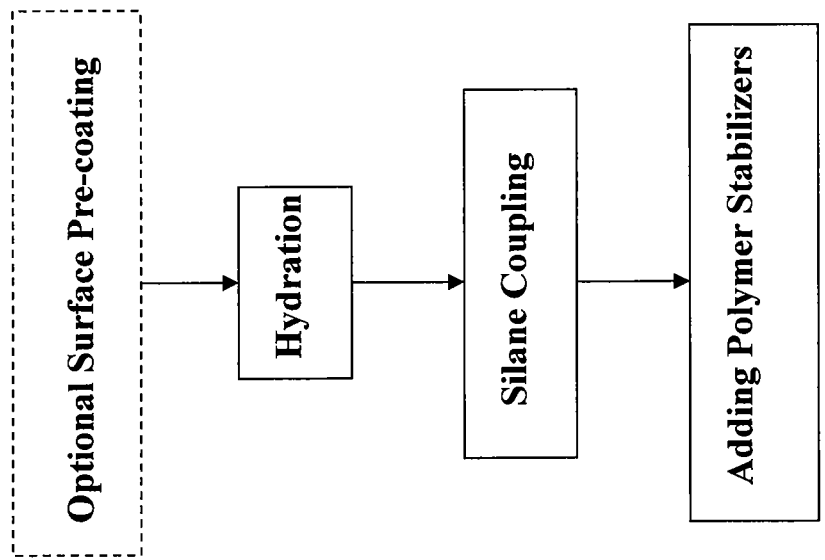

FIG. 2 summarizes the reaction scheme of the present invention.

SUMMARY OF THE PRESENT INVENTION

The first aspect of the present invention is directed to silane treated pigment particles useful for the preparation of pigment particles in an electrophoretic fluid, which particles comprise at least 2.5% by weight of a silane coupling agent attached to the particle surface. In one embodiment, the silane treated pigment particles have a silane content is about 3% to about 4% by weight. In one embodiment, the silane treated pigment particles are formed of $TiO_2$ core pigment particles.

In one embodiment, polymer-containing pigment particles prepared from the silane treated pigment particles may comprise about 7% to about 20% by weight of polymer.

In one embodiment, the $TiO_2$ core pigment particles in the silane treated pigment particles are pre-coated with $SiO_2$, $Al_2O_3$, $ZrO_2$ or any combination thereof. In one embodiment, the $TiO_2$ core pigment particles in the silane treated pigment particles have a specific gravity of less than 4. In one embodiment, the $TiO_2$ core pigment particles in the silane treated pigment particles have an oil absorption value of higher than 25. In one embodiment, the $TiO_2$ core pigment particles in the silane treated pigment particles have a size in the range of about 0.1 um to about 0.6 um. In one embodiment, the $TiO_2$ core pigment particles in the silane treated pigment particles have a surface area of more than 15 $m^2$/gram.

The second aspect of the present invention is directed to a process for the preparation of the polymer containing pigment particles, which process comprises hydration of the $TiO_2$ core pigment particles before the silane coupling reaction to increase the density of hydroxyl reactive sites on the particle surface. In one embodiment, the process further comprises pre-coating the $TiO_2$ core pigment particles with $SiO_2$, $Al_2O_3$, $ZrO_2$ or any combination thereof. In one embodiment, the process further comprises silane coupling reaction and surface grafting or polymerization.

In one embodiment, the the silane coupling reaction is carried out with a silane coupling agent selected from the group consisting of aminopropyl trimethoxysilane, glycidoxypropyl trimethoxysilane, hydroxymethyltriethoxy-silane, methacryloxypropyltrimethoxysilane, N-[3-(trimethoxysilyl)propyl]-N'-(4-vinylbenzyl)ethylenediamine hydrochloride), 3-(N-styrylmethyl-2-aminoethylamino)-propyltrimethoxysilane and a chlorosilane.

In one embodiment, the silane coupling reaction is carried out with a silane coupling agent selected from the group consisting of 3-isocyanotopropyltrimethoxy silane, N-(2-aminoethyl)-3-aminopropyltrimethoxysilane, 3-aminopropyltri-methoxysilane and methacryloxypropyltrimethoxysilane.

In one embodiment, the surface grafting is carried out with a polymer selected from the group consisting of polyethylene, polypropylene, polyacrylate, polyurethane, polyester and polysiloxane.

In one embodiment, the surface polymerization is carried out with a monomer selected from the group consisting of lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate and n-octadecyl methacrylate.

The third aspect of the present invention is directed to an electrophoretic fluid comprising the polymer containing pigment particles dispersed in a dielectric solvent or solvent mixture.

The fourth aspect of the present invention is directed to an electrophoretic display device comprising display cells wherein the display cells are filled with an electrophoretic fluid of the present invention.

DETAILED DESCRIPTION OF THE INVENTION

An electrophoretic display relies on the movement of charged pigment particles under an electric field to display images. The solvent or solvent mixture to disperse the charged pigment particles is usually an organic solvent with a low dielectric constant.

FIG. 1 illustrates a pigment particle of the present invention, in which polymer stabilizers (12) are attached to the surface of a core particle (10) through a silane linking moiety (11). The pigment particle of such a structure can be easily dispersed in a solvent due to the presence of the polymer stabilizers.

To form the polymer stabilizers on the core particle surface, the particle surface is first functionalized (i.e., pre-treated) so that the particle surface may be coupled with the polymer stabilizers. For example, the surface of the core pigment particle may be first treated with silane.

However, the silane treatment of the particle surface greatly depends on the particle surface area and the density of reactive sites (e.g., hydroxyl functionalities). For a normal TiO$_2$ core particle (for example, Du Pont Ti-pure) with an average particle size of 0.3 um and a surface area of less than 15 m$^2$/gram, the silane content on the core particle surface is usually below about 2% by weight, when an acrylate silane (Z6030 from Dow Corning) is coupled to the particle surface. The low silane content inevitably causes fewer polymer stabilizers to be attached to the particle surface, which leads to poor electrophoretic performance, such as low white reflectance and low contrast ratio.

The present inventors have now found that the silane content of pigment particles may be raised to at least about 2.5% and preferably between about 3% to about 4%, by weight.

The term "silane content" in the context of the present invention, refers to the weight percentage of a silane coupling agent attached to the surface of a silane-treated pigment particle wherein the weight of the silane-treated pigment particle includes the weight of the core pigment particle and the silane coupling agent.

The term "about" as used herein, refers to ±5% of the recited value.

The core pigment particles suitable for the present invention may be any types of pigment particles.

However, it is preferred that the core pigment particles are TiO$_2$ white particles. More preferably, the TiO$_2$ white particles are optionally pre-treated to have a thin layer of coating on the particle surface. The thin coating may be formed of SiO$_2$, Al$_2$O$_3$, ZrO$_2$ or the like, or any combination thereof. The surface pre-coating preferably is in an amount of at least 5% by weight of the core pigment particles. In one example, the surface coating may have at least 5% by weight of Al$_2$O$_3$ and/or at least 7% by weight of SiO$_2$.

The thin coating has many advantages. For example, it minimizes the photocatalytic effect of the TiO$_2$ particles. In addition, the coating increases the surface area of the particles to more than 15 m$^2$/gram, thus providing the possibility of adding more reactive sites to the particle surface.

The specific gravity of the TiO$_2$ core pigment particles is preferably less than 4.

The oil absorption value of the TiO$_2$ core particles is preferably higher than 25 and the size of the core particles is preferably in the range of about 0.1 um to about 0.6 um.

The process of the present invention is summarized in FIG. 2.

The reactive sites on the core particle surface may be hydroxyl groups. Some of the hydroxyl groups on the particle surface are present on the particle surface as a result of the pre-coating process, as described above.

The density of the reactive sites on the core particle surface may be increased, according to the present invention, to facilitate the increase of the silane content.

In order to achieve a higher content of the reactive hydroxyl groups, the TiO$_2$ core particles are dispersed in water at a temperature between about 25° C. to about 75° C. The hydration process may be carried out in an ultrasonic bath optionally with mechanical stirring for at least 2 hours.

The solid TiO$_2$ is then separated from water through centrifugation. Additional fresh water is added to the solid particles and the mixture is further stirred, followed by centrifugation. Such steps may be repeated 2-3 times. The hydration process as described increases the hydroxyl content on the particle surface.

After the hydration process to increase the reactive hydroxyl sites on the core particle surface, a silane coupling reaction takes place.

In general, the commonly used organosilane coupling agent for pigment surface treatment may be expressed as follows:

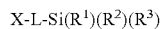

$$X\text{-}L\text{-}Si(R^1)(R^2)(R^3)$$

wherein L can be any organic chain that remains chemically attached to the silicon atom once the coupling reaction is completed. X in general is a functional moiety, which includes, but is not limited to alkoxy, halogen, hydroxy, aryloxy, amino, amide, acrylate, methacrylate, (4-vinylbenzyl) ethylenediamine hydrochloride, styrylmethyl-2-aminoethylamino, isocyanate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkyl-isothiouronium;

R$^1$ is a hydrolysable moiety (such as alkoxy, halogen, hydroxy, aryloxy, amino, amide, methacrylate, mercapto, carbonyl, urethane, pyrrole, carboxy, cyano, aminoacyl, or acylamino, alkyl ester, or aryl ester), which reacts with the active group on pigment particle; a preferred hydrolysable moiety is an alkoxy group, for example, a methoxy or an ethoxy group; and R$^2$ and R$^3$ are independently a hydrolysable moiety as described in R$^1$, or R$^2$ and R$^3$ can be any carbon-bearing moiety that does not react with the pigment particle during coupling process, such as substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl.

More than one siloxane bond can be formed between the pigment particle and the silane coupling agent.

In one embodiment, R$^1$, R$^2$ and R$^3$ are independently hydrolysable groups as describe above. The preferable hydrolysable groups are alkoxy groups. The silanes containing the alkoxy groups may be hydrolyzed to form silanol-containing species. These silanol species will react with the hydroxyl groups on the core particle surface through condensation. The coupling efficiency of silane to the core particle surface depends on the available reactive sites (i.e., hydroxyl groups) on the particle surface. The type of the silane coupling agent and process conditions, such as reaction time, temperature or chemical concentrations would also influence the coupling efficiency.

Suitable silane coupling agents may include, but are not limited to, aminopropyl trimethoxysilane, glycidoxypropyl trimethoxysilane, hydroxymethyltriethoxy-silane, methacryloxypropyltrimethoxysilane, N-[3-(trimethoxysilyl)propyl]-N'-(4-vinylbenzyl)ethylenediamine hydrochloride, 3-(N-styrylmethyl-2-aminoethylamino)-propyltrimethoxysilane or chlorosilane.

The reaction conditions for the silane coupling reaction would depend on the type of the coupling agent and the type of the core pigment particles. In any case, a person skilled in the art would know how to choose the proper reaction conditions based on the coupling agent and pigment particles selected.

The silane linking moiety on the particle surface, especially the organic substituent X in silane is then available to react with monomers, oligomers or polymers to form polymer stabilizers. The silane treated pigment particles with polymer stabilizers attached are referred to as "polymer-containing pigment particles" in the context of the present invention.

The polymer stabilizers are desired to create a steric barrier of about 1 nm to about 50 nm, preferably about 5 nm to about 30 nm, and more preferably about 10 nm to about 20 nm, in thickness, on the pigment particle surface.

Suitable polymers, in the context of the present invention, may include, but are not limited to polyethylene, polypropylene, polyacrylate, polyurethane, polyester or polysiloxane. Suitable monomers include, but are not limited to, lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate and n-octadecyl methacrylate.

In general, the presence of the stabilizers on the particle surface is key to achieve an electrophoretic fluid of good performance. Selection of the material for the polymer stabilizers would depend on the compatibility of the material with the solvent used in an electrophoretic fluid. For example, if in a hydrocarbon solvent, a polyester may not stabilize the particles in it, while an acrylate can provide a stable dispersion.

The polymer stabilizers formed from the monomers, oligomers or polymers may have a single chain or a branched chain. They may also have different configurations, such as coils, stretched chains or irregular tangled chains on the particle surface, depending on compatibility of the polymer to the solvent in which the particles are dispersed and/or the density and length of the polymer chains. The polymer stabilizers may also have brush- or fiber-like structures.

On the surface of the pigment particles, there may be only one single type of the polymer stabilizers or several types of polymer stabilizers of different structures.

The polymer stabilizers may also be cross-linked to form a polymer network over the surface of the core pigment particles.

There are different ways to bind a steric stabilizer polymer or oligomer onto core particle surface through silane linking molecule. For example, the hydroxyl terminated polymer stabilizers may be attached onto the surface of the core pigment particles by first coupling the core pigment particles with an isocyanate silane (e.g., 3-isocyanotopropyltrimethoxy silane). The isocyanate group on the isocyanate silane is then reacted with the hydroxyl group on the polymer stabilizers.

Alternatively, the polymer stabilizers may be isocyanate terminated, such as poly(propylene glycol), tolylene 2,4-diisocyanate terminated (Aldrich 433497). In this case, a silane with an amino group (e.g., N-(2-aminoethyl)-3-aminopropyltrimethoxysilane or 3-aminopropyltri-methoxysilane) is first coupled with the core pigment particles and then the amino group will bond with the isocyanate group on the polymer stabilizers.

Further alternatively, an initiator and/or a polymerizable group may be bonded to the core particle surface, followed by polymerizing monomers onto the particle surface to form a chain to stabilize the pigment particles in an electrophoretic fluid. For example, silanes with acrylate group (e.g., methacryloxypropyltrimethoxysilane or N-[3-(trimethoxysilyl)propyl]-N'-(4-vinylbenzyl)ethylenediamine hydrochloride) may be coupled to the core particle surface, and then different types of acrylate monomers may be polymerized onto the particle surface to form the polymer stabilizers.

According to the present invention, the silane content may reach at least 2.5%, preferably about 3 to about 4% by weight of the silane treated particle surface. With a higher content of silane on the surface of the silane treated $TiO_2$ core particles, more polymer stabilizers may grow on the core particle surface through surface polymerization or grafting. In some instances, the polymer content in the polymer containing pigment particles, according to the present invention, may increase to about 7% to about 20% by weight When $TiO_2$ pigment particles having a high content of polymer stabilizers because of the higher content of silane are dispersed in an electrophoretic fluid, the display device may achieve a higher whiteness (about 45%) and a higher contrast ratio (greater about 15).

Another aspect of the present invention is directed to an electrophoretic fluid comprising the polymer containing pigment particles as described above dispersed in a solvent or solvent mixture. The fluid may comprise only one type of the polymer containing pigment particles or two types of the polymer containing pigment particles of contrast colors and carrying opposite charge polarities. In a two-particle system, at least one type of the particles is prepared according to the present invention.

The solvent or solvent mixture in which the polymer containing pigment particles are dispersed preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Delaware, polydimethylsiloxane based silicone oil from Dow-corning (DC −200). The solvent or solvent mixture may be colored by a dye or pigment.

In an electrophoretic fluid comprising two types of polymer containing pigment particles carrying opposite charge polarities and are of contrast colors, the particles preferably have a polymer layer on their surface as described above to prevent them from sticking to each other. The polymer stabilizers would serve this purpose. Otherwise, in the case of a black/white display device, the reflectance at the white and black states will suffer.

The polymer containing pigment particles after surface modification will have a certain charge in an electrophoretic fluid in the presence of a charge control agent. The charge polarity will be determined by pigment surface functionality, the silane coupling agent used and the type of the charge control agent. For white particles formed from $TiO_2$, either positive or negative charge may be generated through selection of different silane coupling agents. The charge intensity of the particles will be affected by silane quantity on the surface, the type and quantity of polymer stabilizers and the type and quantity of the charge control agent.

Usually a higher silane content will results in a higher charge on particles and lead to a faster switching speed.

In the present invention, a higher silane content was achieved on $TiO_2$ pigment particles as shown in the example, which can result in better charged particles, a faster speed and a higher contrast ratio, upon driving.

A further aspect of the invention is directed to an electrophoretic display wherein the display cells are filled with an electrophoretic fluid as described above. The term "display cell" is intended to refer to a micro-container which is individually filled with a display fluid. Examples of "display cell" include, but are not limited to, microcups, microcapsules, micro-channels, other partition-typed display cells and equivalents thereof.

Example 1

I. Hydration Process of $TiO_2$ Core Pigment Particles 100 g of $TiO_2$ (TiPure R-931) was dispersed in 400 g of water. The mixture was put in an ultrasonic bath at temperature 60° C. The mixture was also stirred with a mechanical stirrer for about 2 hours.

The solid $TiO_2$ was separated from water through centrifugation. Additional 400 g of fresh water was poured into the solid again, and stirred for 30 minutes. The solid was again separated from water through centrifugation. The process was repeated one more time. The solid was ready for silane coupling reaction.

II. Silane Coupling Reaction on $TiO_2$ Core Pigment Particles

The solid obtained from Step I above was mixed with 450 g of MEK (methylethylketone). A silane coupling agent, 3-(methacryloxyl)propyl-trimethoxysilane (Z6030, Dow Corning) in the amount of 42 g was added into the mixture. The container was put in an ultrasonic bath at temperature 65° C. The mixture was stirred with a mechanical stirrer for 3 hours. The solid was then separated from the liquid through centrifugation and dried in a vacuum oven.

The reaction resulted in silane treated $TiO_2$ particles in the form of dried powder. The silane content was tested through TGA to be between 3.0% and 4.0% by weight.

III. Surface Polymerization

To a reaction flask, the particles (50 g) prepared from Step II and 200 g of toluene were added and sonicated for 30 minutes, followed by the addition of lauryl acrylate (60 g) and azobisisobutyronitrile (AIBN, 0.6 g). The flask was purged with nitrogen for 20 minutes and then heated to 70° C. After 20 hours, the polymer coated-particles were recovered by centrifugation at 6000 rpm for 10 minutes. The solids produced were redispersed in toluene and centrifuged. The solids were dried at room temperature under vacuum to produce the final product.

Example 2 (Comparative Example)

100 g of $TiO_2$ (TiPure R-960) was mixed with 450 g of MEK (methylethylketone). A silane coupling agent Z6030 (Dow Corning) in the amount of 42 g was added into the mixture. The container was put in an ultrasonic bath at temperature of 65° C. The mixture was stirred with a mechanical stirrer for 3 hours. The solid was then separated from the liquid through centrifugation and dried in a vacuum oven.

The reaction resulted in silane modified $TiO_2$ particles in the form of dried powder. The silane content was tested through TGA to be between 1.5% and 2.0% by weight.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic fluid comprising charged polymer containing pigment particles and a charge control agent dispersed in a dielectric solvent or solvent mixture, wherein the polymer containing pigment particle comprises
    (a) a $TiO_2$ core pigment particle pretreated to have a surface area of more than 15 $m^2$/gram;
    (b) polymer stabilizers; and
    (c) a silane linking moiety which attaches the polymer stabilizers to the surface of the core particle,
wherein the polymer containing pigment particle has a silane content of at least about 2.5% by weight, and the $TiO_2$ core pigment particle has a size in the range of about 0.1 μm to about 0.6 μm.

2. An electrophoretic display device comprising display cells, wherein the display cells are filled with the electrophoretic fluid of claim 1.

3. The fluid of claim 1, wherein the polymer containing pigment particle has a silane content of about 3% to about 4% by weight.

4. The fluid of claim 1, wherein the polymer containing pigment particle comprises 7% to 20% by weight of polymer.

5. The fluid of claim 1, wherein the $TiO_2$ core pigment particle is pre-coated with $SiO_2$, $Al_2O_3$, $ZrO_2$, or any combination thereof.

6. The fluid of claim 1, wherein the $TiO_2$ core pigment particle has a specific gravity of less than 4.

7. The fluid of claim 1, wherein the $TiO_2$ core pigment particle has an oil absorption value of higher than 25.

8. An electrophoretic display device comprising display cells, wherein the display cells are filled with the electrophoretic fluid of claim 3.

9. An electrophoretic display device comprising display cells, wherein the display cells are filled with the electrophoretic fluid of claim 4.

10. An electrophoretic display device comprising display cells, wherein the display cells are filled with the electrophoretic fluid of claim 5.

* * * * *